United States Patent
Soria et al.

(10) Patent No.: US 10,072,181 B2
(45) Date of Patent: Sep. 11, 2018

(54) LASER PRINTER SYSTEMS, INTERMEDIATE TRANSFER MEMBERS, PRIMER LAYERS FOR INTERMEDIATE TRANSFER MEMBERS, AND PRIMER LAYER COMPOSITIONS

(75) Inventors: Meir Soria, Jerusalem (IL); Frida Avadic, Rishon Le Tzion (IL); Yevgenia Rudoy, Rishon Lezion (IL); Nava Klein, Rishon Le Tzion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 913 days.

(21) Appl. No.: 12/374,993

(22) PCT Filed: Jul. 25, 2006

(86) PCT No.: PCT/US2006/028757
§ 371 (c)(1),
(2), (4) Date: Jan. 19, 2011

(87) PCT Pub. No.: WO2008/013521
PCT Pub. Date: Jan. 31, 2008

(65) Prior Publication Data
US 2011/0123797 A1    May 26, 2011

(51) Int. Cl.
| | | |
|---|---|---|
| *B32B 27/08* | (2006.01) | |
| *C09D 183/04* | (2006.01) | |
| *C08J 7/04* | (2006.01) | |
| *G03G 15/16* | (2006.01) | |

(52) U.S. Cl.
CPC ............ *C09D 183/04* (2013.01); *C08J 7/042* (2013.01); *G03G 15/162* (2013.01); *Y10T 428/269* (2015.01); *Y10T 428/31663* (2015.04)

(58) Field of Classification Search
None
See application file for complete search history.

(56) References Cited

U.S. PATENT DOCUMENTS

| | | | | |
|---|---|---|---|---|
| 4,332,844 A | * | 6/1982 | Hamada et al. ............... 427/387 |
| 4,600,673 A | * | 7/1986 | Hendrickson et al. ......... 430/66 |
| 4,942,202 A | * | 7/1990 | Zama et al. ................... 525/104 |
| 5,260,455 A | * | 11/1993 | Eckberg .................... C07F 7/08 522/25 |
| 5,336,748 A | * | 8/1994 | Castellucci .................... 528/38 |

(Continued)

FOREIGN PATENT DOCUMENTS

| | | | |
|---|---|---|---|
| EP | 0164879 | 12/1985 | |
| EP | 0604104 A2 * | 6/1994 | ........... C08K 5/0091 |

(Continued)

OTHER PUBLICATIONS

"RTV Silicone Application Guide", (hereinafter "Guide") retrieved Jun. 9, 2011, from http://www.mgchemicals.com/products/silcones/appguide/auto_app.html.*

(Continued)

*Primary Examiner* — Kenneth J Stachel
(74) *Attorney, Agent, or Firm* — Thorpe North & Western LLP

(57) ABSTRACT

Briefly described, embodiments of this disclosure includes intermediate transfer members, primer layer materials, methods of forming an intermediate transfer member layers having a base and an acrylic rubber layer, are disclosed.

20 Claims, 2 Drawing Sheets

(56) References Cited

U.S. PATENT DOCUMENTS

| | | | | |
|---|---|---|---|---|
| 6,017,587 | A * | 1/2000 | Kleyer | C08L 83/04 427/387 |
| 6,035,172 | A * | 3/2000 | Mimura | G03G 15/0818 399/286 |
| 6,207,769 | B1 * | 3/2001 | Gerlach | C08K 5/541 428/447 |
| 6,212,350 | B1 * | 4/2001 | Yamada | G03G 15/161 399/302 |
| 6,551,716 | B1 * | 4/2003 | Landa et al. | 428/447 |
| 6,908,682 | B2 * | 6/2005 | Mistele | 428/447 |
| 2003/0064320 | A1 * | 4/2003 | Hanabata | G03F 7/0382 430/270.1 |
| 2003/0087175 | A1 * | 5/2003 | Simpson et al. | 430/126 |
| 2004/0253436 | A1 * | 12/2004 | Heeks et al. | 428/328 |
| 2005/0223658 | A1 * | 10/2005 | Reed | B29C 70/305 52/102 |
| 2006/0204768 | A1 * | 9/2006 | King et al. | 428/447 |
| 2007/0004859 | A1 * | 1/2007 | Bacher | C09D 143/04 525/56 |
| 2007/0135590 | A1 * | 6/2007 | Kotani et al. | 525/479 |
| 2007/0167563 | A1 * | 7/2007 | Cray | C09D 183/04 524/588 |

FOREIGN PATENT DOCUMENTS

| | | |
|---|---|---|
| EP | 0986778 | 4/2003 |
| GB | 2316079 | 2/1998 |
| JP | 04178461 A * | 6/1992 |
| JP | 09169960 A * | 6/1997 |
| WO | 09707433 | 2/1997 |

OTHER PUBLICATIONS

English machine translation of JP09169960 (1997).*
English machine translation of JP04178461 (1992).*

* cited by examiner

LASER PRINTER SYSTEMS, INTERMEDIATE TRANSFER MEMBERS, PRIMER LAYERS FOR INTERMEDIATE TRANSFER MEMBERS, AND PRIMER LAYER COMPOSITIONS

BACKGROUND

Various techniques for electrostatic image transfer are known. One method includes the use of an intermediate transfer member. A liquid image, which includes a liquid carrier having ink particles dispersed therein, is transferred from a photoconductive surface of a photoconductive member or drum to a surface (e.g., a release layer or blanket) of the intermediate transfer member. The liquid image is attracted from the photoconductive surface to the surface of the intermediate transfer member. The liquid carrier is removed from the surface of the intermediate transfer member and the ink particles are compacted on the surface in the image configuration. Thereafter, the ink particles are transferred from the surface of the intermediate transfer member to a substrate in the image configuration by pressure application. The surface of the intermediate transfer member should have good adhesion and release properties, but cures relatively slowly, has a short pot life, and low mechanical strength. Therefore, there is a need in the industry for release layers that overcome at least some of the disadvantages of current release layers.

SUMMARY

Briefly described, embodiments of this disclosure includes intermediate transfer members, primer layer materials, methods of forming an intermediate transfer member layers having a base and an acrylic rubber layer, are disclosed. One exemplary embodiment of an intermediate transfer member, among others, includes: an intermediate transfer member base; an acrylic rubber layer disposed on the intermediate transfer member base; a primer layer disposed on the acrylic rubber layer; and an addition cure RTV silicone layer disposed on the primer layer, wherein the primer layer substantially eliminates a poisoning of the addition cure RTV silicone layer by the acrylic rubber layer.

One exemplary embodiment of a primer layer material, among others, includes: an epoxyalkylalkoxysilane compound; an alkenylsilane compound; a polyorganohydrosiloxane; and a titanium catalyst.

One exemplary embodiment of an intermediate transfer member layer having a base and an acrylic rubber layer, among others, includes: providing a primer layer material that includes an epoxyalkylalkoxysilane compound, an alkenylsilane compound, a polyorganohydrosiloxane, and a titanium catalyst; disposing the primer layer material on the acrylic rubber layer; drying the primer layer material on the acrylic rubber layer to form a primer layer; disposing an addition cure RTV silicone layer material on the primer layer; and curing the addition cure RTV silicone layer material on the primer layer to form an addition cure RTV silicone layer, wherein the primer layer substantially eliminates a poisoning of the addition cure RTV silicone layer by the acrylic rubber layer.

One exemplary embodiment of methods for preparing an image recording medium, among others, includes: providing a water-soluble polymer, a radiation absorbing compound, an activator, and a color former; mixing the water-soluble polymer, the radiation absorbing compound, the activator, and the color former; and disposing the direct imaging material onto a substrate.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

DETAILED DESCRIPTION

Figure 1:
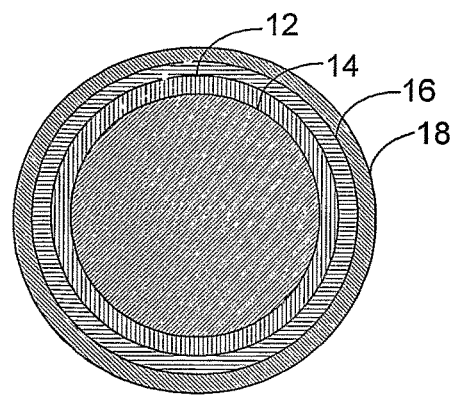
FIG. 1 illustrates an illustrative embodiment of an intermediate transfer member of the present disclosure.

Embodiments of the present disclosure will employ, unless otherwise indicated, techniques of synthetic organic chemistry, ink chemistry, media chemistry, printing chemistry, and the like, that are within the skill of the art. Such techniques are explained fully in the literature.

The following examples are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an" and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Laser printer systems, laser printer systems including intermediate transfer members, primer layers for intermediate transfer members, primer layer compositions used to make primer layers, are provided. In general, embodiments of the present disclosure describe laser printer systems having intermediate transfer members that include a primer layer disposed between an acrylic rubber layer and an addition cure RTV silicone layer. The addition cure RTV silicone layer is advantageous over condensation cure silicone layers because the addition cure RTV silicone layer cures faster, gives higher mechanical strength, and does not have a pot life problem. Also, there appears to be little or no silanols present after the addition cure RTV silicone layer is cured to interact with ink compositions disposed on the addition cure RTV silicone layer. The use of the addition cure RTV silicone layer is facilitated by the use of the primer layer disposed between the acrylic rubber layer and the addition cure RTV silicone layer. The primer layer reduces or eliminates the inhibition problems (e.g., due to the presence of ammonium residue and/or sulfur compounds present on the acrylic rubber layer surface) and subsequent adhesion problems that are encountered when the addition cure RTV silicone layer is disposed directly on the acrylic rubber layer. Although not intending to be bound by theory, the primer layer appears to act as a barrier to the poisoning species on the surface of the acrylic rubber layer. The primer layer ensures a sufficient anchorage between the acrylic substrate and the addition cure silicone layer.

FIG. 1 illustrates an embodiment of an ITM 10. The ITM 10 includes, but is not limited to, an ITM base 12, an acrylic rubber layer 14 disposed on the ITM base 12, a primer layer 16 disposed on the acrylic rubber layer 14, and a release blanket layer 18 disposed on the primer layer 16. The ITM base 12 is a structure that additional layers of material can be disposed on. The ITM base 12 is interfaced with the laser printer apparatus and the appropriate systems to rotate the ITM base at an appropriate speed relative to the other components of the laser printer apparatus.

The acrylic rubber layer 14 is disposed on the ITM base 12 using techniques known in the art (e.g., U.S. Pat. No. 6,551,716, which is included herein by reference). The acrylic rubber layer 14 is a blend of an acrylic resin Hi-Temp 4051 EP (Zeon) filled with carbon black pearls 130 (Cabot) and its curing system constituted by NPC-50 accelerator (ammonium derivative from Zeon) and sodium stearate crosslinker. The acrylic rubber is at a non-cured state and has still active cure site (chorine and carboxylic groups—from Zeon data).

The primer layer 16 is disposed on the acrylic rubber layer 14. Prior to formation of the primer layer 16, a primer layer material is formulated. The primer layer material can be disposed on the acrylic rubber layer 14 at about +/−10° C. of room temperature and cured for about 1 to 24 hours and about 12 hours. The primer layer 16 can have thickness of about 0.01 to 1 micron.

The primer layer material is made of a plurality of components. The primer layer material can include, but is not limited to, an epoxyalkylalkoxysilane compound, an alkenylsilane compound, a polyorganohydrosiloxane, and a titanium catalyst.

The epoxyalkylalkoxysilane compound is described by the formula

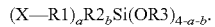

(X—R1)$_a$R2$_b$Si(OR3)$_{4-a-b}$.

Where R1 is a divalent hydrocarbon group having from 1 to 4 carbon atoms, R2 and R3 each represents a monovalent hydrocarbon group having from 1 to 4 carbons atom, X represents glycidoxy group or epoxycyclohexyl group. It should be noted that "a" is one to three and "b" is zero to two, with the proviso that a+b is 1, 2, or 3. In an embodiment, the epoxyalkylalkoxysilane compound includes some of its condensed forms constituted by oligomers of the epoxyalkylalkoxysilane monomer. The epoxyalkylalkoxysilane compound is about 20 to 80 weight % of the primer layer material, and preferably about 30 to 60 weight % of the primer layer material.

The alkenylsilane compound can include, but is not limited to, a vinyl silane, an allyl silane, a silane compound including an unsaturation, and polymeric forms of each (e.g., polyvinylmethoxysiloxane). In particular, the vinyl silane compound can include, but is not limited to, vinyltrimethoxysilane (SIV9220.0 ABCR) and vinyltriethoxysilane (SIV9112.0 ABCR). In particular, the allyl silane compound can include, but is not limited to, allyltrimethoxysilane (SIA0540.0 ABCR) and allyltriethoxysilane (SIA0525.0 ABCR). In particular, the silane compound including an unsaturation compound can include, but is not limited to, polyvinylmethoxysiloxane (VMM010 ABCR). In an embodiment, the silane compound is vinyl trimethoxysilane, and allyltrimethoxysilane. The silane compound is about 20 to 80 weight % of the primer layer material and about 30 to 60 weight % of the primer layer material.

The polyorganohydrosiloxane compound can include, but is not limited to, polymethylhydrosiloxane with trimethylsilyl endgroups, polymethylhydrosiloxane with dimethylhydrosilyl endgroups, dimethylsiloxane methylhydrosiloxane copolymers with trimethylsilyl endgroups, dimethylsiloxane Methylhydrosiloxane copolymers with dimethylhydrosilyl endgproups, and combinations thereof. In an embodiment, the polyorganohydrosiloxane includes the polyorganohydrosiloxane crosslinker 101 (Hanse Chemie) (dimethylsiloxane methylhydrosiloxane copolymers with trimethylsilyl endgroups type) and the polyorganohydrosiloxane crosslinker 210 (Hanse Chemie) (dimethylsiloxane methylhydrosiloxane copolymers with dimethylhydrosilyl end groups). The polyorganosiloxane compound is about 2 to 50 weight % of the primer layer material and about 10 to 30 weight % of the primer layer material. The titanium catalyst can include, but is not limited to, organic titanium. The organic titanium can include, but is not limited to, tetraisopropyl titanate, tetra-n-butyltitanate, titanium acetylacetonate, DuPont TYZOR® AA titanium acetylacetonates bis (pentane-2,4-dionato-O,O')bis(alkanolato)titanium (e.g., AA, AA75, AA95, and AA105 grades), and combinations thereof. In an embodiment, the titanium catalyst is butyltitanate. The titanium catalyst is about 1 to 20 weight % of the primer layer material and about 5 to 15 weight % of the primer layer material.

As mentioned above, the release blanket layer 18 is disposed on the primer layer 16 using techniques known in the art (e.g., U.S. Pat. No. 6,551,716, which is included herein by reference). The release blanket layer 18 can be made of materials such as, but not limited to, addition cure RTV silicone material:

polydimethylsiloxane dimethylvinylsilyl terminated of viscosity 500-5000 cp (polymer VS500, Polymer VS1000, Polymer VS2000, Polymer VS 5000 from Hanse Chemie);

dimethylsiloxane Methylhydrosiloxane copolymers with trimethylsilyl endgroups (crosslinker 101 Hanse Chemie) or diMethylsiloxane Methylhydrosiloxane copolymers with dimethylhydrosilyl endgproups (crosslinker 210 Hanse Chemie);

hydrosilylation catalyst (platinum based catalyst, catalyst 510 from Hanse Chemie 0.5% platinum)

hydrosilylation inhibitor (Inhibitor 600 from Hanse Chemie);

optionally, polydimethylsiloxane with dimethylhydrosilyl endgroups that acts as chain extender (Modifier 700 series Hanse chemie); and optionally, vinyl silicone resins (VQM 820 Hanse Chemie).

The formulation of the addition cure RTV ibased on the vinyl polymer includes:
Polymer VS, 100 parts;
Crosslinker (101 or 210), 3-10 parts;
Catalyst 510, 0.2-2 parts;
Inhibitor 600, 1-5 parts; and
Vinyl resin (optional), 1-20 parts.

The addition cure RTV silicone cures at room temperature, its curing time may be shortened significantly by increasing the temperature of the cure (100° C.).

The release layer 18 can have a thickness of about 2 to 20 microns or about 3 to 10 microns.

Figure 2A:
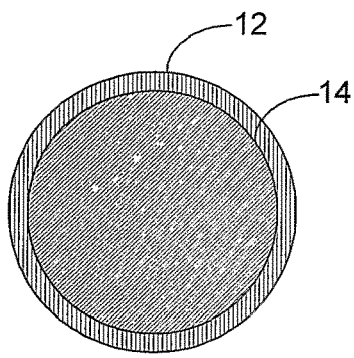
FIGS. 2A through 2C illustrate an embodiment of forming the intermediate transfer member having the primer layer of the present disclosure.
Figure 2B:
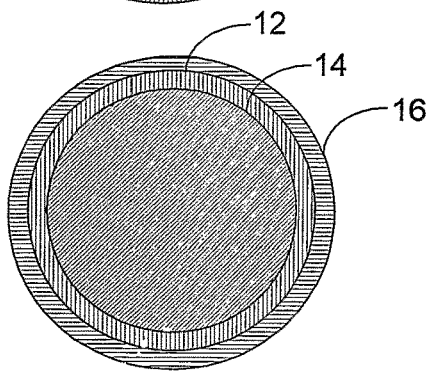
Figure 2C:
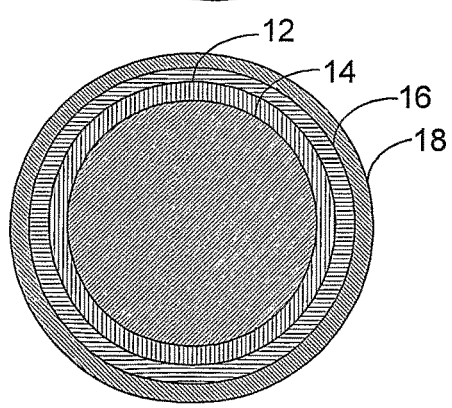

FIGS. 2A through 2C illustrate an embodiment of forming the ITM 10 having the primer layer 16. FIG. 2A illustrates the ITM base 12 having the acrylic rubber layer 14 disposed thereon. FIG. 2B illustrates the primer layer 16 disposed on the acrylic rubber layer 14. The primer layer 16 is formed by disposing the primer layer material onto the acrylic rubber layer 14 and curing for a timer period of about 12 hours. FIG. 2C illustrates the addition cure RTV silicone layer 18 disposed on the primer layer 16.

Figure 3:
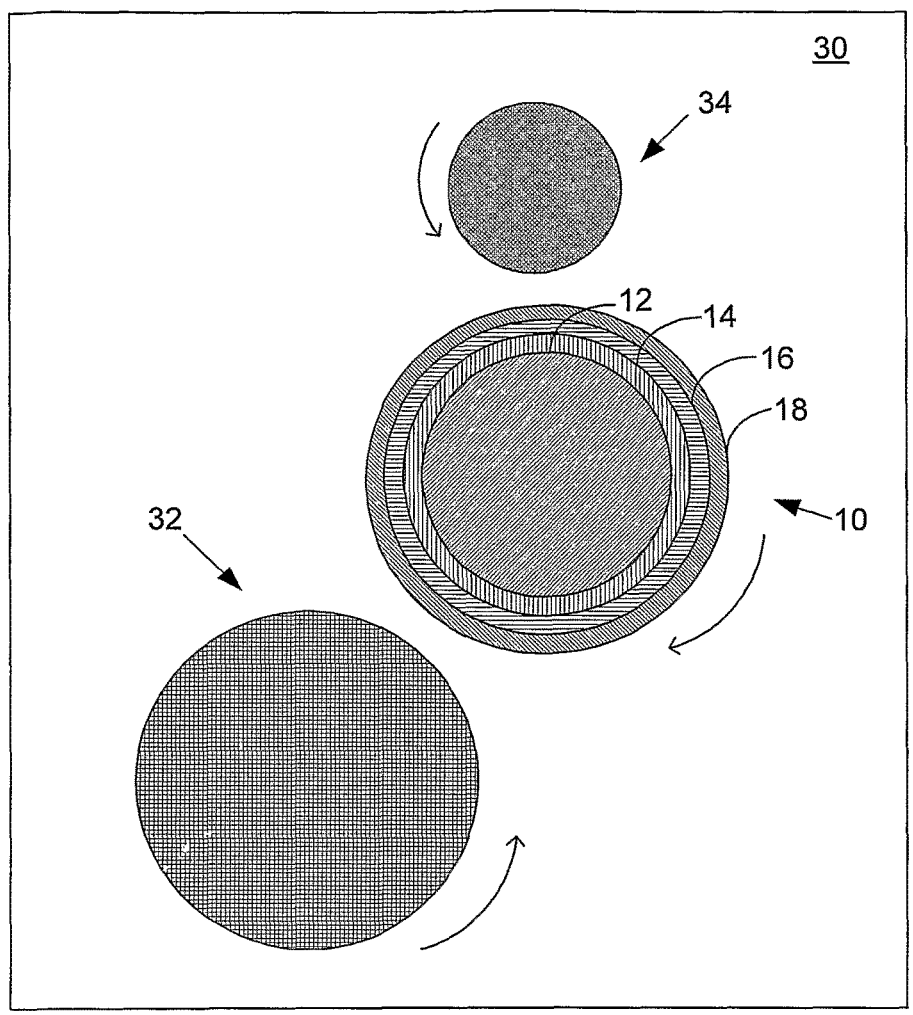
FIG. 3 illustrates an exemplary embodiment of a laser printer system or press machine of the present disclosure.

FIG. 3 illustrates an exemplary embodiment of a laser printer system 30 or press machine of the present disclosure. The laser printer system 30 includes a drum 32 that has a photoconductive surface. When the laser printer system 30 is operated the drum 32 rotates and the photoconductive surface is charged by a charger to a generally uniform pre-determined voltage, typically a negative voltage of the order of 1000 Volts. The charger may be any type of charger known in the art, such as a corotron, a scorotron or a roller. In one embodiment of the disclosure the charger includes multiple double scorotrons, each having a housing and two corona wire segments. In an embodiment, the voltage between wires and the photoconductive surface is about 7000-7500 Volts.

Rotation of the drum 32 brings the charged photoconductive surface into image receiving relationship with an exposure system (not shown), such as a light source. The exposure system may be a laser scanner in the case of a printer, or the projection of an image in the case of a photocopier. In one embodiment of the present disclosure, the light source is a modulated laser beam scanning apparatus, or other laser imaging apparatus such as is known in the art.

The exposure system forms a desired electrostatic image on the charged photoconductive surface by selectively discharging portions of the photoconductive surface. The image portions are at a first voltage and the background portions are at a second voltage. In one embodiment the discharged portions have a negative voltage of less than about 100 Volts.

Continued rotation of drum 32 brings the charged photoconductive surface, having the electrostatic image, into operative engagement with a series of six developer rollers (not shown). The developer rollers are for printing of different colors. The developer rollers rotate in a direction opposite to that of drum 32, such that there is substantially no relative motion between their respective surfaces at the point of contact. In one embodiment the surfaces of developer rollers are made of a soft polyurethane material made more electrically conductive by the inclusion of conducting additives, while the core of each developer roller may be made of any suitable electrically conductive material. Alternatively, the drum 32 may be formed of a relatively resilient material, and in such case the surfaces of developer rollers may be composed of either a rigid or a compliant material. In one embodiment the developer rollers are charged to a negative voltage of approximately 300-600 Volts.

As described below, the surfaces are coated with a very thin layer of concentrated liquid ink, or toner, containing 20-50% charged toner particles. The layer of toner is between 5 and 30 μm thick. The developer rollers are themselves charged to a voltage that is intermediate the voltage of the charged and discharged areas on the photoconductive surface. The liquid toner for each developer assembly is stored in a respective toner reservoir.

When surfaces of developer rollers having the layer of liquid toner concentrate thereon are engaged with photoconductive surface of drum 32, the difference in voltage between each developer roller and the photoconductive surface causes the selective transfer of the layer of toner particles to the photoconductive surface. This causes the desired electrostatic image to be developed on the photoconductive surface. Depending on the choice of toner charge polarity and the use of a "write-white" or "write-black" system, the layer of toner particles is selectively attracted to either the charged or discharged areas of photoconductive surface, and the remaining portions of the toner layer will continue to adhere to surfaces of developer rollers.

In one embodiment, the concentrated layer of liquid toner is completely transferred to the photoconductor surface during development. In another embodiment, only a portion of the thickness of the concentrated toner layer is transferred to surface by appropriately adjusting the development voltages.

Downstream of development assemblies is a background discharge device. The discharge device is operative to flood the photoconductor surface with light that discharges the voltage remaining on photoconductor surface. This reduces electrical breakdown and improves subsequent transfer of the image. Operation of such a device in a write black system is described in U.S. Pat. No. 5,280,326, which is incorporated herein by reference.

The electrostatic image developed is transferred to the desired substrate via an intermediate transfer member (ITM) 10 in operative engagement with photoconductive surface of drum 32 having the developed image. The ITM 10 rotates opposite to that of the photoconductive surface providing substantially zero relative motion between their respective surfaces at the point of image transfer.

The ITM 10 is operative for receiving the developed image onto a release blanket layer 18 thereof from the photoconductive surface, and for transferring this image to a final substrate 34, such as paper. The final substrate 34 is urged against the release blanket layer 18 of the ITM 10. The transfer of the developed image from ITM 10 to the final substrate 34 is electrostatically assisted to counteract the electrostatic attraction of the developed image to the ITM 10.

The ITM 10 may include a heater disposed therein to heat the ITM 10 as is known in the art. Transfer of the developed image to the ITM 10 is aided by providing electrification of the ITM 10 to provide an electric field between the ITM 10 and the image areas of the photoconductive surface. The ITM 10 is maintained at a suitable voltage and temperature for electrostatic transfer of the image thereto from the photoconductive surface. The configuration of such an ITM 10 is known to those skilled in the art.

The developed image may include a plurality of different colors that are successively deposited on the photoconductive surface. The color image is then transferred to ITM 10. Subsequent images in different colors are sequentially transferred in alignment with the previous image Onto ITM 10.

When all of the desired images have been transferred, the complete multi-color image is transferred from ITM 10 to the substrate 34.

While embodiments of the present disclosure are described in connection with Example 1 and the corresponding text and figures, there is no intent to limit the disclosure to the embodiments in these descriptions. On the contrary, the intent is to cover all alternatives, modifications, and equivalents included within the spirit and scope of embodiments of the present disclosure.

EXAMPLE 1

In an illustrative embodiment, the following primer is disposed on the blanket (acrylic rubber layer) at 25° C. using a stainless steel rod:

glycidoxypropyl trimethoxysilane (GLYMO Degussa) 36 parts

| | |
|---|---|
| Vinyltrimethoxysilane (SIV9220.0 ABCR) | 36 parts |
| Crosslinker 101 (Hanse Chemie) | 19 parts |
| N Butyl Titanate (AKT 850 ABCR) | 9 parts |
| The primer dries for 12 hours at 25° H. | |

Then the release layer is coated on the primer layer. The release layer has the following formulation:

| | |
|---|---|
| Polymer VS1000 (Hanse Chemie) | 100 parts |
| Inhibitor 600 (Hanse Chemie) | 2 parts |
| Crosslinker 101 (Hanse Chemie) | 5 parts |
| Catalyst 510 (hanse Chemie) | 1 part |

The release layer cures onto the primer layer and its anchorage is excellent. The anchorage test is based on a hand made abrasion test. The release cannot be removed from the conforming layer even after strong abrasion after isopar soak.

The same test was done using a primer that does not include the polymethylHydrosiloxane (crosslinker 101). The addition cure release formulation cures on the conforming layer but did not adhere. The release is peeled off easily using our hand made abrasion test.

It was found that the polymethylhydrosiloxane reacts instantly when it is in contact with the acrylic resin. Although not intending to be bound by theory, this reaction is probably due to the reaction between the Si—H group present in the polymethylhydrosiloxane with the carboxylic function contained in the acrylic resin. This reaction explains the strong anchorage of the addition cure release on the conforming layer.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

Many variations and modifications may be made to the above-described embodiments. All such modifications and variations are intended to be included herein within the scope of this disclosure and protected by the following claims.

At least the following is claimed:

1. An intermediate transfer member comprising:
   an intermediate transfer member base;
   an acrylic rubber layer disposed on the intermediate transfer member base;
   a primer layer disposed on the acrylic rubber layer, wherein the primer layer is made from a primer layer composition that includes a silane compound, an alkenylsilane compound, a first crosslinker comprising a dimethylsiloxane methylhydrosiloxane copolymer with dimethylhydrosilyl end groups, and a titanium catalyst, wherein the silane compound is described by the formula

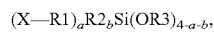

$$(X\text{—}R1)_a R2_b Si(OR3)_{4-a-b},$$

wherein R1 is a divalent hydrocarbon group having from 1 to 4 carbon atoms, wherein R2 and R3 each represent a monovalent hydrocarbon group having from 1 to 4 carbons atom, wherein X represents an epoxycyclohexyl group, wherein "a" is one to three and "b" is zero to two, with the proviso that a+b is 1, 2, or 3 wherein the primer layer is anchored to the acrylic rubber layer by a reaction product between a Si—H group of a methylhydrosiloxane unit or dimethylhydrosilyl end group of the dimethylsiloxane methylhydrosiloxane copolymer with dimethylhydrosilyl end groups and a carboxylic function in the acrylic rubber; and
   an addition cure RTV silicone layer disposed on the primer layer, wherein the primer layer substantially eliminates a poisoning of a platinum catalyst in the addition cure RTV silicone layer by the acrylic rubber layer and
   wherein the addition cure RTV silicone layer comprises a second crosslinker, the second crosslinker selected from: dimethylsiloxane methylhydrosiloxane copolymer with trimethylsilyl endgroups or dimethylsiloxane methylhydrosiloxane copolymer with dimethylhydrosilyl endgroups.

2. The intermediate transfer member of claim 1, wherein the alkenylsilane compound is selected from: an allyl silane, a silane compound including an unsaturation, and polymeric forms of each.

3. The intermediate transfer member of claim 1, wherein the titanium catalyst comprises titanium acetylacetonate.

4. The intermediate transfer member of claim 1, wherein the silane compound is about 20 to 80 weight % of the primer layer composition, the alkenylsilane compound is about 20 to 80 weight % of the primer layer composition, the first crosslinker is about 2 to 50 weight % of the primer layer composition, and the titanium catalyst is about 1 to 20 weight % of the primer layer composition.

5. The intermediate transfer member of claim 1, wherein the primer layer has a thickness of about 0.01 to 1 micron.

6. The intermediate transfer member of claim 1, wherein the addition cure RTV silicone layer comprises:
   polydimethylsiloxane dimethylvinylsilyl terminated of viscosity of 500-5000 cP;
   dimethylsiloxane methylhydrosiloxane copolymers with trimethylsilyl endgroups;
   hydrosilylation catalyst comprising platinum; and
   hydrosilylation inhibitor.

7. The intermediate transfer member of claim 1, in which the addition cure RTV silicone layer comprises:

100 parts polydimethylsiloxane dimethylvinylsilyl terminated of viscosity of 500-5000 cP;
3-10 parts dimethylsiloxane methylhydrosiloxane copolymers with trimethylsilyl endgroups;
0.2-2 parts hydrosilylation catalyst comprising platinum
1-5 parts hydrosilylation inhibitor; and
1-20 parts vinyl resin,
where parts are parts per weight per 100 parts polydimethylsiloxane dimethylvinylsilyl terminated of viscosity of 500-5000 cP.

8. The intermediate transfer member of claim 1, in which the addition cure RTV silicone layer comprises a thickness between 3-10 microns.

9. A method of forming an intermediate transfer member layer having a base and an acrylic rubber layer comprising:
providing an acrylic rubber material;
disposing the acrylic rubber material on the base to form the acrylic rubber layer, the acrylic rubber layer comprising a non-cured state;
providing a primer layer material that includes a silane compound, an alkenylsilane compound, a crosslinker comprising a dimethylsiloxane methylhydrosiloxane copolymer with dimethylhydrosilyl end groups, and a titanium catalyst, wherein the silane compound is described by the formula (X—R1)$_a$R2$_b$Si(OR3)$_{4-a-b}$, wherein R1 is a divalent hydrocarbon group having from 1 to 4 carbon atoms, wherein R2 and R3 each represent a monovalent hydrocarbon group having from 1 to 4 carbons atom, wherein X represents a glycidoxy group or an epoxycyclohexyl group, wherein "a" is two or three and "b" is zero to two, with the proviso that a+b is 2 or 3;
disposing the primer layer material on the acrylic rubber layer while the acrylic rubber layer is in the non-cured state;
drying the primer layer material on the acrylic rubber layer to form a primer layer wherein the primer layer is anchored to the acrylic rubber layer by a reaction product between a Si—H group of a methylhydrosiloxane unit or dimethylhydrosilyl end group of the dimethylsiloxane methylhydrosiloxane copolymer with dimethylhydrosilyl end groups and a carboxylic function in the acrylic rubber;
disposing an addition cure RTV silicone layer material comprising a platinum catalyst on the primer layer; and
curing the addition cure RTV silicone layer material on the primer layer to form an addition cure RTV silicone layer, wherein the primer layer substantially eliminates a poisoning of the addition cure RTV silicone layer by the acrylic rubber layer.

10. The method of claim 9, in which the non-cured state of the acrylic rubber layer comprises active chlorine and carboxylic groups, in which drying the primer layer material on the acrylic rubber layer to form a primer layer comprises forming bonds between Si—H groups in the primer layer and carboxylic groups contained in the acrylic rubber layer.

11. The method of claim 9, wherein the alkenylsilane compound is selected from: an allyl silane, a silane compound including an unsaturation, and polymeric forms of each.

12. The method of claim 9, wherein the titanium catalyst comprises titanium acetylacetonate.

13. The method of claim 9, wherein the silane compound is about 20 to 80 weight % of the primer layer material, the alkenylsilane compound is about 20 to 80 weight % of the primer layer material, the crosslinker is about 2 to 50 weight % of the primer layer material, and the titanium catalyst is about 1 to 20 weight % of the primer layer material.

14. The method of claim 9, wherein the primer layer has a thickness of about 0.01 to 1 micron.

15. The method of claim 9, in which the addition cure RTV silicone layer comprises:
100 parts polydimethylsiloxane dimethylvinylsilyl terminated of viscosity of 500-5000 cP;
3-10 parts dimethylsiloxane methylhydrosiloxane copolymers with trimethylsilyl endgroups;
0.2-2 parts hydrosilylation catalyst comprising platinum
1-5 parts hydrosilylation inhibitor; and
1-20 parts vinyl resin,
where parts are parts per weight per 100 parts polydimethylsiloxane dimethylvinylsilyl terminated of viscosity of 500-5000 cP.

16. An intermediate transfer member comprising:
an intermediate transfer member base;
an acrylic rubber layer disposed on the intermediate transfer member base;
a primer layer disposed on the acrylic rubber layer, wherein the primer layer is made from a primer layer composition that includes a silane compound, an alkenylsilane compound, a crosslinker comprising a dimethylsiloxane methylhydrosiloxane copolymer with dimethylhydrosilyl end groups, and a titanium catalyst, wherein the silane compound is described by the formula (X—R1)$_a$R2$_b$Si(OR3)$_{4-a-b}$, wherein R1 is a divalent hydrocarbon group having from 1 to 4 carbon atoms, wherein R2 and R3 each represent a monovalent hydrocarbon group having from 1 to 4 carbons atom, wherein X represents a glycidoxy group or an epoxycyclohexyl group, wherein "a" is one to three and "b" is zero to two, with the proviso that a+b is 2 or 3 wherein the primer layer is anchored to the acrylic rubber layer by a reaction product between a Si—H group of a methylhydrosiloxane unit or dimethylhydrosilyl end group of the dimethylsiloxane methylhydrosiloxane copolymer with dimethylhydrosilyl end groups and a carboxylic function in the acrylic rubber; and
an addition cure RTV silicone layer disposed on the primer layer, wherein the primer layer substantially eliminates a poisoning of the addition cure RTV silicone layer comprising a platinum catalyst by the acrylic rubber layer.

17. The intermediate transfer member of claim 16, wherein the alkenylsilane compound is selected from: an allyl silane, a silane compound including an unsaturation, and polymeric forms of each.

18. The intermediate transfer member of claim 16, wherein the titanium catalyst comprises titanium acetylacetonate.

19. The intermediate transfer member of claim 16, wherein the silane compound is about 20 to 80 weight % of the primer layer composition, the alkenylsilane compound is about 20 to 80 weight % of the primer layer composition, the crosslinker is about 2 to 50 weight % of the primer layer composition material, and the titanium catalyst is about 1 to 20 weight % of the primer layer composition.

20. The intermediate transfer member of claim 16, wherein the primer layer has a thickness of about 0.01 to 1 micron.

* * * * *

UNITED STATES PATENT AND TRADEMARK OFFICE
CERTIFICATE OF CORRECTION

PATENT NO. : 10,072,181 B2
APPLICATION NO. : 12/374993
DATED : September 11, 2018
INVENTOR(S) : Meir Soria et al.

It is certified that error appears in the above-identified patent and that said Letters Patent is hereby corrected as shown below:

In the Claims

In Column 10, Line 61 (approx.), Claim 19, after "composition" delete "material".

Signed and Sealed this
Eighth Day of January, 2019

Andrei Iancu
*Director of the United States Patent and Trademark Office*